June 24, 1941.  H. E. GANTZER  2,246,582
CONTROL APPARATUS
Filed April 22, 1939   4 Sheets-Sheet 1
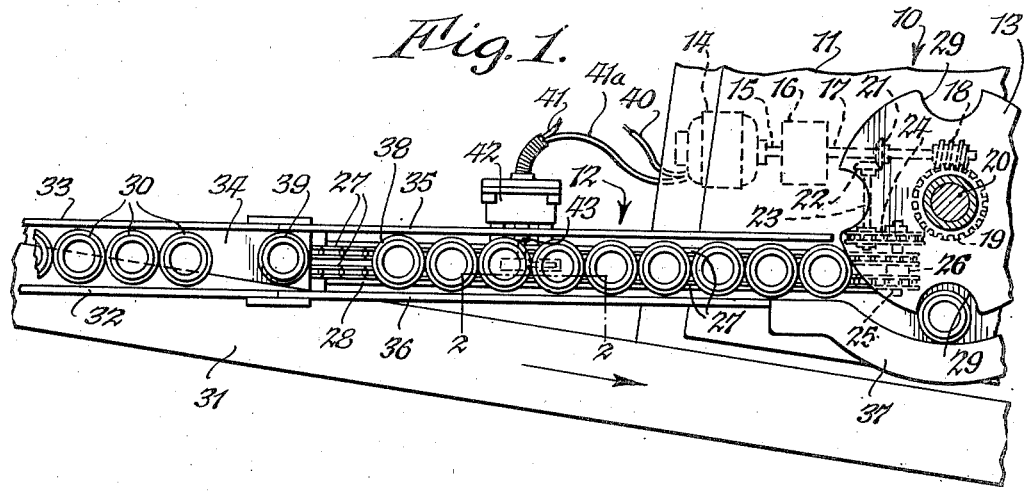
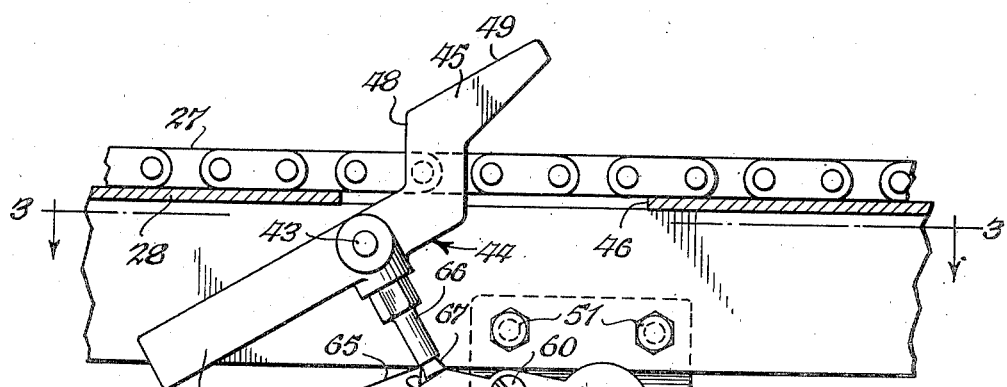
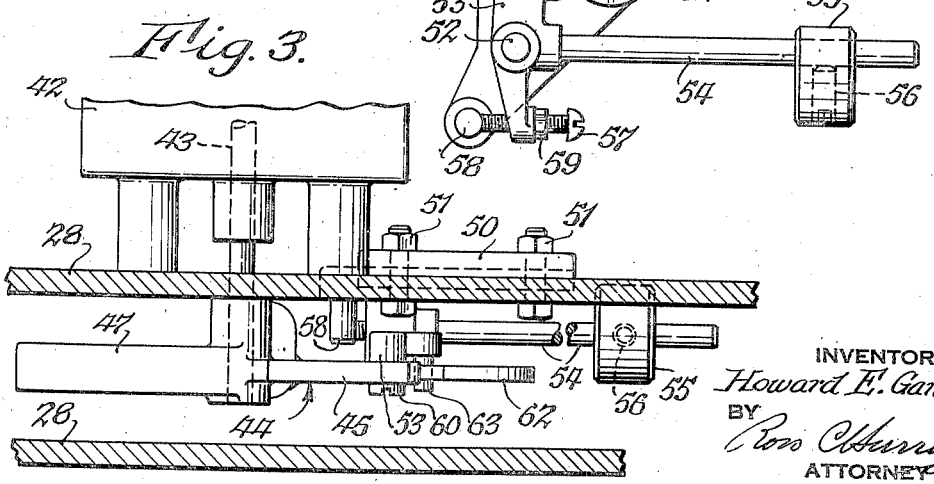
INVENTOR
Howard E. Gantzer
BY
ATTORNEY June 24, 1941.   H. E. GANTZER   2,246,582
CONTROL APPARATUS
Filed April 22, 1939   4 Sheets-Sheet 2
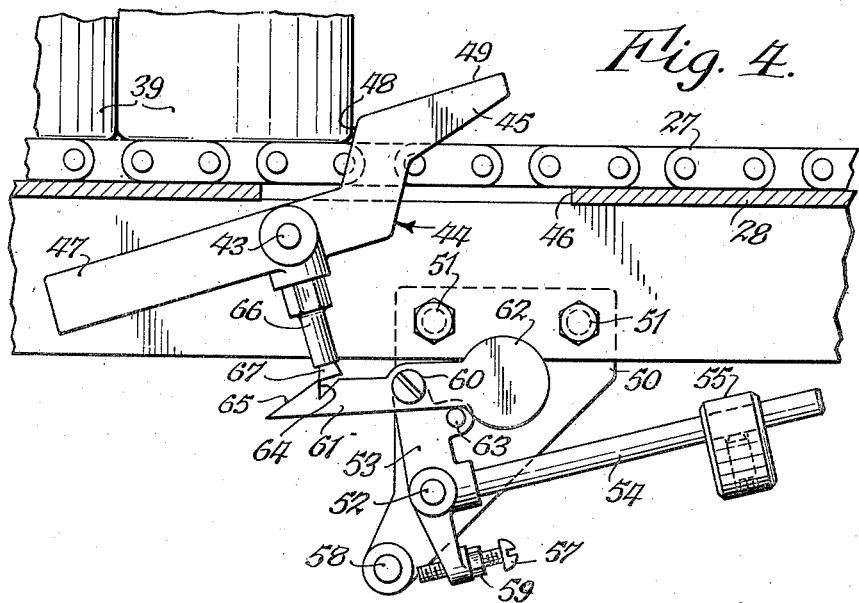
Fig. 4.
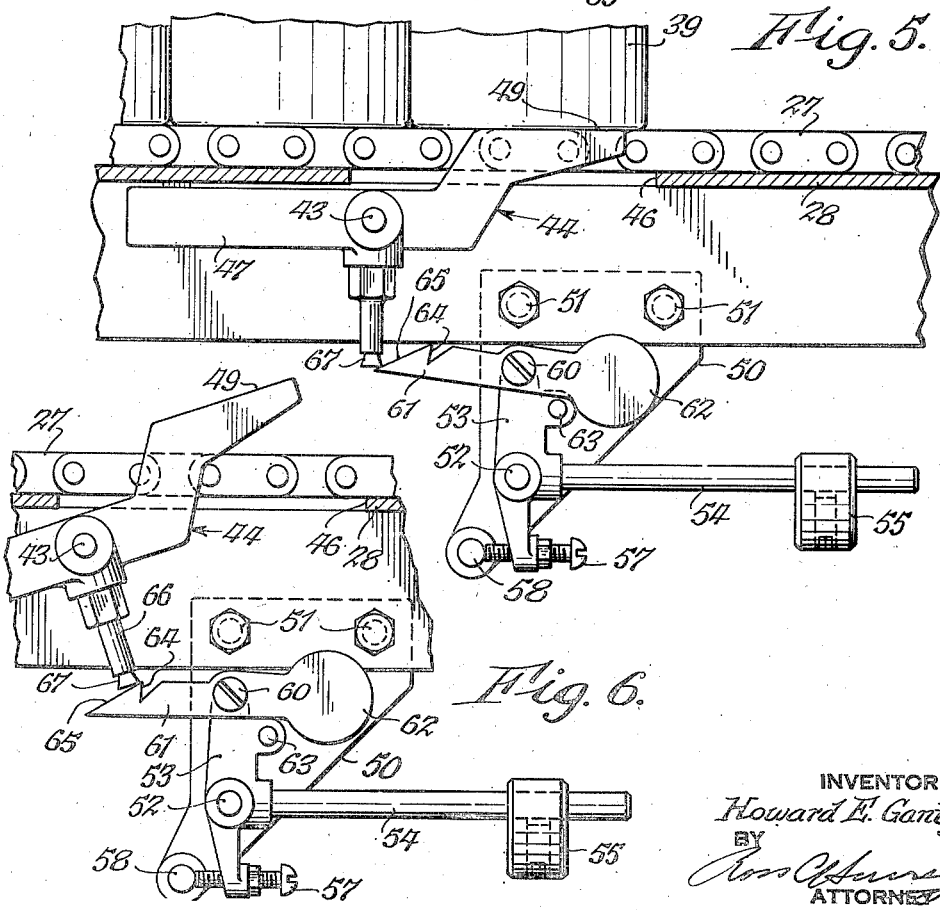
Fig. 5.
Fig. 6.
INVENTOR
Howard E. Gantzer
BY
ATTORNEY June 24, 1941.   H. E. GANTZER   2,246,582
CONTROL APPARATUS
Filed April 22, 1939   4 Sheets-Sheet 3
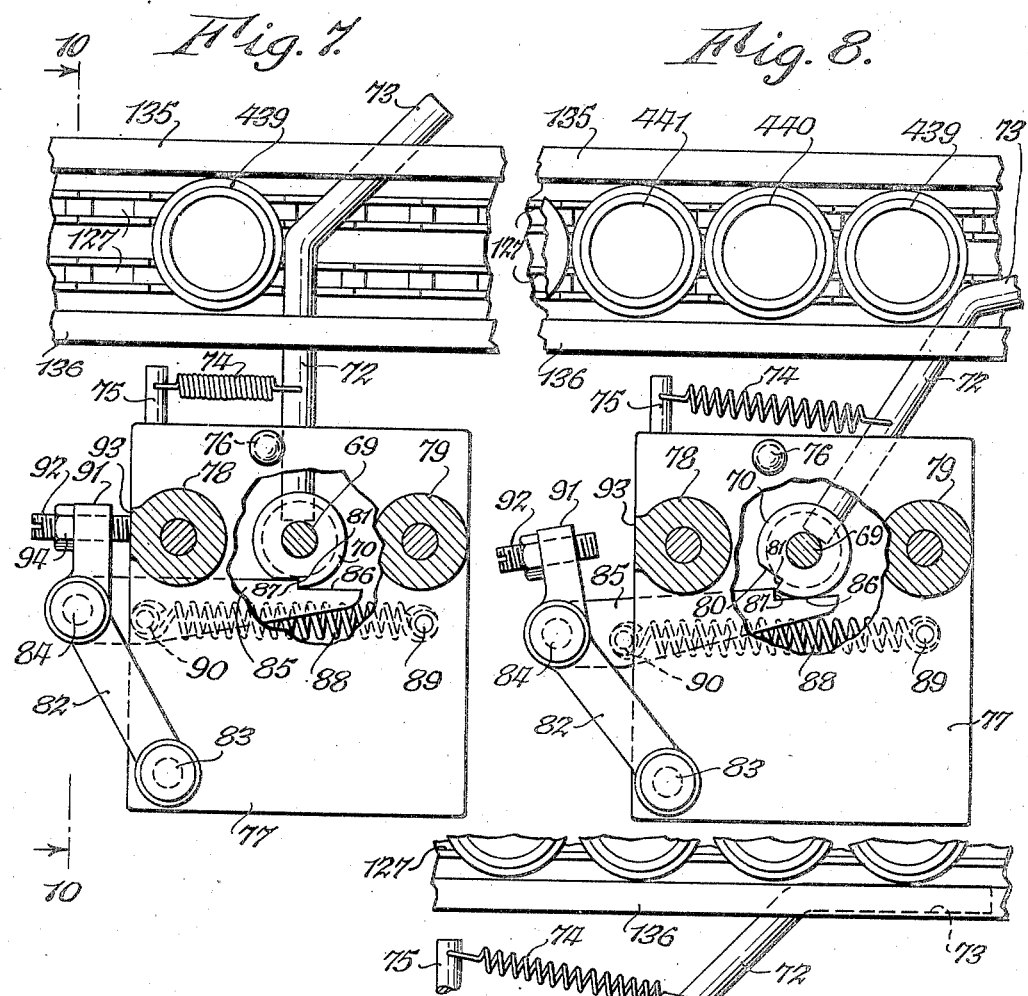
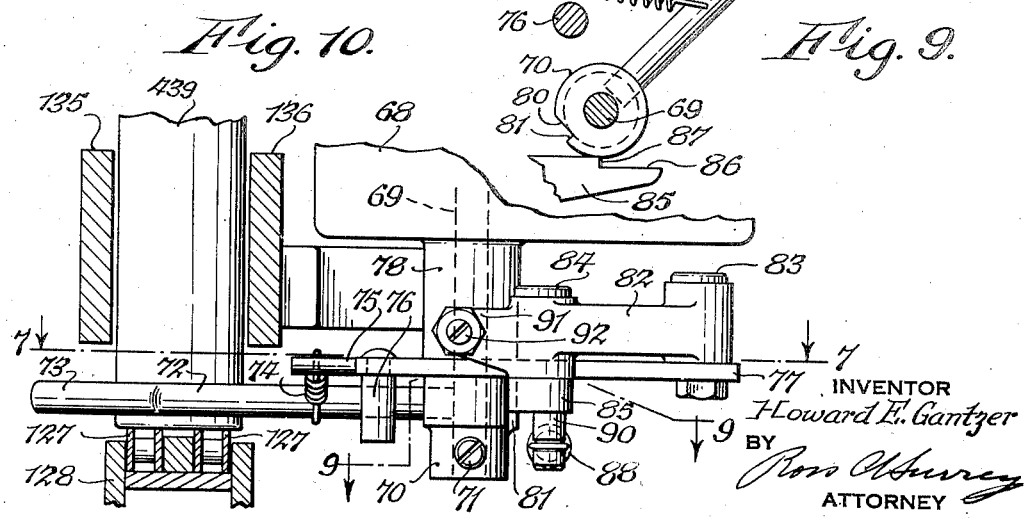
INVENTOR
Howard E. Gantzer
BY
ATTORNEY June 24, 1941.  H. E. GANTZER  2,246,582
CONTROL APPARATUS
Filed April 22, 1939  4 Sheets-Sheet 4
Fig. 11.
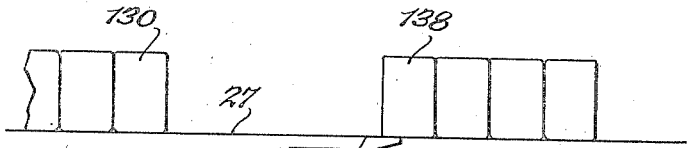
Fig. 12.
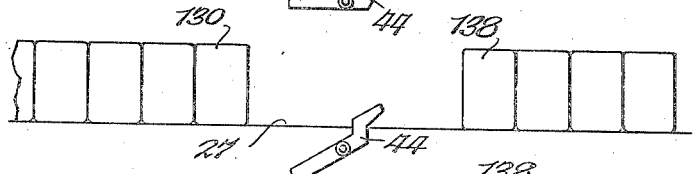
Fig. 13.
Fig. 14.
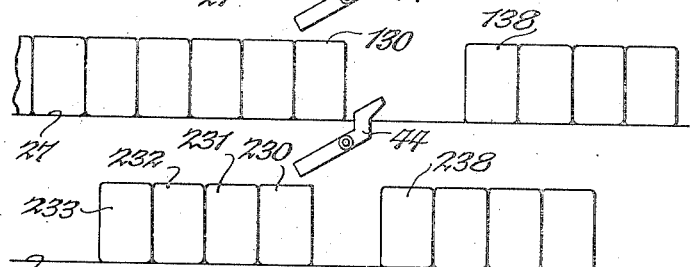
Fig. 15.
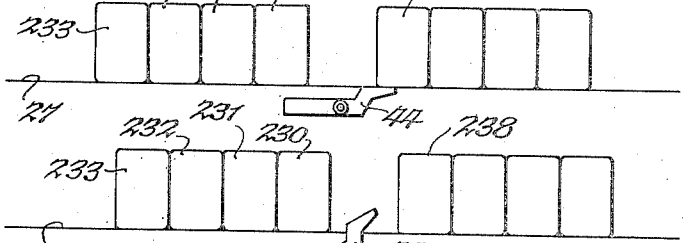
Fig. 16.
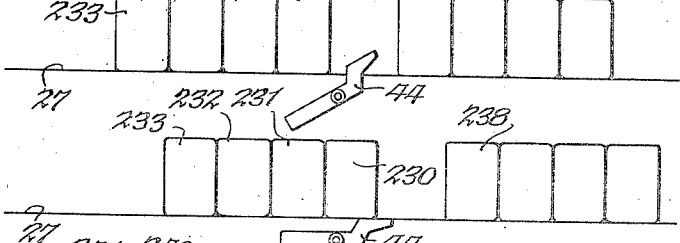
Fig. 17.
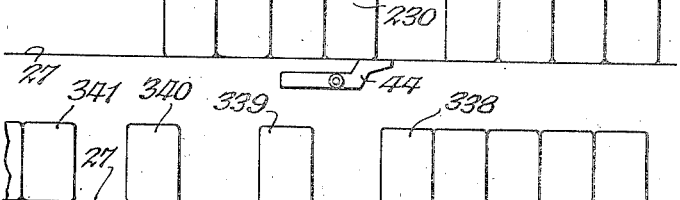
Fig. 18.
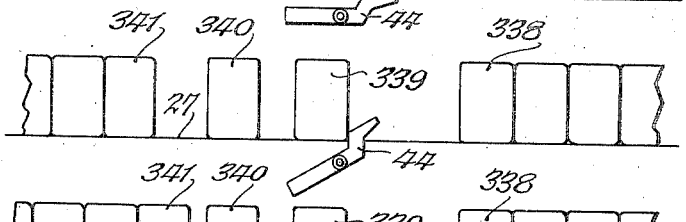
Fig. 19.
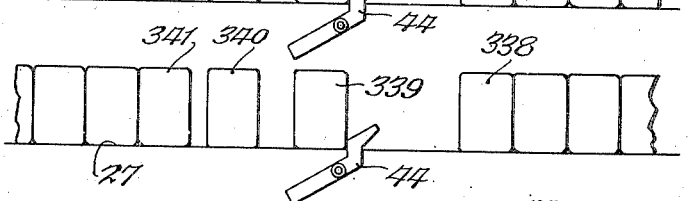
INVENTOR
Howard E. Gantzer
BY
ATTORNEY Patented June 24, 1941

2,246,582

UNITED STATES PATENT OFFICE 2,246,582

CONTROL APPARATUS

Howard E. Gantzer, Kenmore, N. Y., assignor to Consolidated Packaging Machinery Corporation, Buffalo, N. Y., a corporation of New York Application April 22, 1939, Serial No. 269,342

10 Claims. (Cl. 192—125)

The present invention relates to a control device and, more particularly, to a control device adapted to control the operation of a conveyor. Even more particularly, the invention relates to a control device responsive to the presence or absence of objects upon a conveyor for controlling the operation of the conveyor. The control device may also be utilized to control mechanism to which a conveyor is intended to carry objects.

The control device forming my invention is well adapted for use in connection with various types of container-handling apparatus. For example, it may be used in a container-capping device and for the purposes of illustration the adaptation of my invention to a container-capping device will be described in the following specification.

Container-capping devices comprise a container-engaging means and a cap-applying means which are driven in such timed relation that containers engaged by the engaging means will be held thereby in position for the application of a cap by the cap-applying means. In many container-capping devices the container-engaging means comprises a notched wheel, hereinafter referred to as a star wheel, which is adapted to separately engage containers and conduct them into operative relation with elements of the cap-applying means as, for example, cap-applying chucks of any well-known form. Containers are frequently fed into engaging position with the star wheel by an intake conveyor arranged to present a line of containers successively to the star wheel in a suitable direction.

Containers may be placed upon the conveyor by hand or they may be furnished to an intake end of such conveyor by other suitable conveying means. In most installations a container-capping device is asociated in a production line with various other machines. Thus, empty, unlabelled containers may be conducted through a filling device, a label-applying device and a capping device. In many such installations the line of containers may be sporadic or interrupted either as a result of irregular operation of one of the other machines or by the necessity for manual transfer of such containers from one machine to the other.

When containers are placed on the intake conveyor of the capping machine by hand, it will be realized that an effort will be made to supply such conveyor with a continuous uninterrupted supply of containers but that such desirable result may not be consistently attained. Thus, it is possible that containers may be placed upon such conveyor in groups of two or three or more or that they may be supplied in a separated widely scattered relationship in which many individual containers will appear entirely separate from any other container.

When containers are supplied to the intake conveyor of the capping machine by another conveyor, it is equally conceivable that wide variations in spacing and grouping may occur. Ordinarily, a main conveyor for conducting containers from one machine to another may comprise a relatively wide flat belt. The intake conveyor of a capping machine may include an intercepting means disposed across the path of the containers carried by such belt and adapted to guide the containers into engagement with the intake conveyor. As pointed out above, there is no assurance that the supply maintained by the main conveyor will be steady and that the intake conveyor will be maintained fully supplied.

For efficient operation of modern high speed capping devices, it has been found desirable to supply the same with as nearly a continuous uninterrupted line of containers as conditions will permit. To this end, certain of such capping machines have been provided with control means which serve to stop the machine whenever the intake of containers is interrupted. Such control means may take the form of an electric switch for breaking the current supply to the motor or for controlling a suitable clutching device. Such provision is satisfactory for use in installations where the line of containers is normally continuous and subject to relatively infrequent interruptions. When the interruptions become relatively frequent and particularly when the supply line may frequently comprise a plurality of spaced individual containers, the frequent starting and stopping of the machine becomes highly objectionable.

It is an object of the present invention to provide control means for a conveyor which will stop the conveyor upon interruption of the line of objects thereon and which will maintain the conveyor in its stopped condition until a suitable number of objects is available to assure operation of the conveyor for a reasonable length of time.

It is a further object of the present invention to provide a control means for a conveyor which will stop such conveyor and which will prevent the restarting thereof by a single object or by a group of objects less than a desirable number.

It is a further object of the present invention to provide a control means for a container-handling machine which is responsive to the presence or absence of containers upon the intake conveyor.

It is a further object of the present invention to provide a control means for container-handling apparatus which will materially reduce the frequency of starting and stopping of operation of such apparatus as a result of irregularity in the supply of containers thereto.

It is a further object of the present invention to provide a control means for container-handling apparatus which may be conveniently adjusted to provide for the supply of predetermined minimum groups of containers to such apparatus.

It is a further object of the present invention to provide a control means for container-capping apparatus which will materially increase the efficiency thereof.

It is a more specific object of my invention to provide a highly efficient latching device for selective interconnection of movable elements.

Other and further objects of my invention will become more apparent from a consideration of the following description.

According to the present invention I have provided a control device which may comprise an electric switch for stopping a conveyor upon interruption of the supply of objects carried by said conveyor. The switch is provided with an operating device projecting into the path of the objects carried by the conveyor and the switch and its operating device is urged to circuit-opening position by means exerting a relatively light force. The objects upon the conveyor may serve to maintain the switch and its operating device in circuit-closing position against the relatively light force of the urging means. Upon interruption of the line of objects, the switch and its operating device will be moved to circuit-opening position by the urging means. I provide additional means such as a loading device engageable with the switch or its operating device during such movement for offering a relatively great amount of resistance to the return of the switch and its operating device to circuit-closing position.

The invention will be more clearly understood from a consideration of the following detailed description of preferred, but not necessarily the only, forms of my invention taken in connection with the drawings accompanying and forming a part of this specification.

In the drawings:

Fig. 1 is a partial plan view of a container-capping machine having a control device thereon in accordance with the present invention;

Fig. 2 is an enlarged elevational view of the control device constituting a preferred form of my invention;

Fig. 3 is a section along the line 3—3 of Fig. 2;

Figs. 4, 5 and 6 are views similar to Fig. 2 and illustrating sequential operation of the control device;

Fig. 7 is a plan view of a modified form of control device which may be applied to the machine illustrated in Fig. 1;

Fig. 8 is a view similar to Fig. 7 and showing the control device in a different position;

Fig. 9 is a partial plan view similar to Fig. 7 and illustrating still another position of the control device.

Fig. 10 is a section along the line 10—10 of Fig. 7;

Figs. 11, 12 and 13 are diagrammatic views illustrating the operation of my control device resulting from a particular arrangement of objects upon a conveyor.

Figs. 14, 15 and 16 are diagrammatic views illustrating the operation of my control device resulting from a different arrangement of objects; and Figs. 17, 18 and 19 are diagrammatic illustrations of the operation of my control device resulting from still a different arrangement of objects upon a conveyor.

Referring now to the drawings;

In Fig. 1, I have shown an illustrative application of my invention to a container-capping device which is associated in a particular manner with a main conveyor. As shown in said figure, the capping machine 10 comprises a main pedestal or base 11, only a portion of which is shown, and upon which is mounted an intake conveyor 12 and a rotary star wheel 13 of any conventional form. The conveyor 12 and star wheel 13 are driven by means such as a motor 14 mounted within the pedestal 11. The drive shaft 15 of the motor may drive a suitable transmission element 16 such as a clutch or a speed control of the Reeves drive type provided in many machines of the type illustrated herein. The driven shaft 17 of the element 16 carries a suitable worm gear 18 which engages with a worm wheel 19 fixed upon the star wheel shaft 20. The star wheel 13 is fixed to the shaft 20 and it will be apparent that the mechanism just described will serve to transmit the rotary motion of the motor 14 to the star wheel 13.

The driven shaft 17 may also carry a suitable bevelled gear 21 positioned for engagement with a bevelled gear 22 mounted upon a shaft 23. The shaft 23 may be connected by a suitable sprocket and chain or other driving device indicated generally at 24 to a stub shaft 25 suitably mounted for rotation in the pedestal 11. The stub shaft 25 carries a double sprocket wheel 26 which serves to drive a pair of conveyor chains 27 forming a part of the intake conveyor 12. The conveyor chains 27 are carried by a suitable supporting and guiding frame 28 mounted upon the base 11. It will be understood that the chains 27 are preferably continuous and are conducted over suitable idler sprocket wheels at their leftwardly projecting ends.

It will be apparent that the mechanism above described provides for driving of the star wheel 13 and of the conveyor chains 27 from a single source of power such as the motor 14. The relative speeds of the star wheel 13 and chains 27 may be widely varied in accordance with particular demands and no attempt is made herein to set forth any definite relationship. In general, however, it will be understood that the conveyor 27 should be driven at a linear speed sufficient to project a container into a notch 29 of the star wheel 13 within the time that such notch is in position to receive a container and that the time thus available is, of course, dependent upon the speed of rotation of the star wheel.

As shown in Fig. 1, a supply of objects such as containers 30 is furnished to the conveyor 12 by a main conveyor 31. This main conveyor will in most instances be continuously driven in the direction of the arrow from a suitable source of power and at a speed commensurate with the speed of operation of all of the machines which with the container-capping device herein shown constitute a particular production line.

The intake conveyor 12 is preferably formed with an intercepting extension 32 which may be in the form of a guide rail extending over the main conveyor 31 and lying within the path of containers 30 carried thereby. It will be apparent that the extension 32 will serve to divert containers from the main conveyor 31 and to guide the same toward the conveyor 12. Preferably, a guide rail 33 generally similar to 32 may be provided to cooperate with the guide 32 to maintain the containers in alignment. It is, of course, obvious that the guide 33 does not extend to any substantial degree over the main conveyor.

A dead plate 34 may be conveniently carried by the supporting structure 28 of the conveyor 12 and is preferably so shaped and mounted as to form a substantial continuation of the plane of the upper surface of the main conveyor 31. The dead plate 34 extends into overlapping relationship with the upper surfaces of the conveyor chains 27 in order that containers may be moved from the main conveyor 31 across the dead plate and onto the conveyor chains 27 in a smooth efficient manner.

The intake conveyor 12 is preferably provided with spaced substantially parallel guide rails 35 and 36 which may form continuations of the guide extensions 32 and 33. The guide rails 35 and 36 serve to maintain containers carried by the conveyor chains 27 in definite alignment. The guide rail 35 preferably extends into close proximity with the star wheel 13. The guide rail 36 extends into contact with a suitable guide 37 carried by the pedestal 11. The guide 37 is preferably shaped to conform to the curved path assumed by the containers in engagement with notches 29 of the star wheel 13.

The structure thus far described operates as follows:

A supply of containers 30 is brought into contact with the guide 32 by the action of main conveyor 31. As the containers are pushed upon the dead plate 34, it will be apparent that further movement must be dependent upon the presence of succeeding containers upon the main conveyor. The movement imparted to succeeding containers will, of course, be transmitted through actual contact to the containers upon the dead plate. If the supply of containers is continuous from the main conveyor 31, the containers will be successively pushed off the plate 34 upon the conveyor chains 27 to be conducted thereby to the star wheel 13. Whenever a break occurs in the continuous supply of containers to the dead plate 34 movement thereof across the dead plate will necessarily be stopped. Since the movement of conveyor 27 continues there will necessarily be a break in the line of containers carried thereby. Such a condition is illustrated in Fig. 1 wherein the last container 38 is shown substantially removed from the edge of the dead plate 34. As further shown in Fig. 1, a container 39 has been moved upon the dead plate 34 but since there are no succeeding containers in contact therewith the container 39 simply remains stationary upon the dead plate. It will remain in this position until the succeeding supply of containers 30 is brought up into contact therewith by the action of the main conveyor 31. The mechanism to be now described provides for stopping of the conveyor 12 and star wheel 13 upon the occurrence of a break of this type.

A suitable source of electric power supply is connected to the wires 40 and 41 in a well-known manner. Wire 40 may be connected directly to the motor 14. Wire 41 is conducted to a suitable make and break switch 42 which serves to make of break an electrical connection between the wire 41 and a wire 41a connected to the other side of motor 14. The switch 42 may be mounted in any convenient manner upon the conveyor supporting structure 28. An operating shaft 43 projects from the switch 42 and a limited rotation of the shaft 43 serves to make or break the electric contact established by the switch 42. The switch 42 may be of any suitable type adapted for operation by rotation of a shaft such as 43. For example, the switch 42 may be a mercury switch or a snap switch of the single throw type.

The switch operating shaft 43 is preferably extended beneath the conveyor chains 27 and has fixed thereto an operating lever 44. The operating lever 44 may be formed with an upward extension 45 adapted to project through an opening 46 formed in the conveyor supporting frame 28 and upwardly between the conveyor chains 27 into a position within the path of containers carried by the conveyor chains. The operating lever 44 may be formed with a weighted extension 47 on the opposite side of the rod 43 which serves to urge the operating lever to rotate in a counterclockwise direction into the position illustrated in Fig. 2. The upwardly extending portion 45 may be formed with an abutment 48 which assumes a substantially vertical position when the operating lever is rotated to the position illustrated in Fig. 2.

Referring now to Fig. 5, it will be seen that a container positioned upon the conveyor chains will serve to maintain the operating lever in a position wherein the surface 49 thereof lies substantially within the plane of the upper surfaces of the conveyor chains 27. The weighted extension 47 serves as above pointed out to urge the lever 44 to the position shown in Fig. 2 but the force thus exerted should be very light in order that there will be no tendency for the lever 44 to lift or otherwise interfere with the movement of a container positioned thereabove.

The mechanism of the switch 42 is preferably so arranged that in the position of the operating lever 44 and shaft 43 illustrated in Fig. 2 the electrical contacts will be opened whereby no driving force will be exerted by the motor 14, while in the position illustrated in Fig. 5 the electrical contacts will be closed to energize the motor. Thus, so long as containers are maintained continuously above the operating lever 44 the motor 14 remains energized and the conveyor 12 and star wheel 13 continue to operate. Upon the occurrence of a break in container supply as illustrated in Fig. 1 the switch 42 will remain closed until the last container 38 passes over the operating lever 44 and permits the same to be rocked by the weighted extension 47 into switch opening position.

The container capping and conveying mechanism of which the conveyor 12 and star wheel 13 form a part are of relatively heavy or substantial nature and are driven at a relatively high rate of speed. The motor 14 is normally quite powerful and accordingly its rotary parts are of substantial weight. When the motor and parts driven thereby are operating at their full speed and the current supply is cut off, it will be apparent that substantial coasting or overrun is to be expected due to the momentum of the motor and driven parts. If braking mechanism of some type is provided to absorb momentum and to produce sudden stopping of the mechanism the relatively large forces to be absorbed are such as to produce severe strain upon the machine. It has been found impractical to attempt to control a container supply by the provision of a braking means. The thus practically unavoidable overrun of the capping machine and conveyor chains 27 which occurs after breaking the electric contacts within the switch 42 will result in carrying the last container 38 a rather substantial distance beyond the switch operating lever 44. If the space between the last container 38 and the next succeeding container is quite wide, the machine will be allowed to stop and would not normally be restarted until a completely solid line of containers is built up by the main conveyor 31 and pushed thereby over the dead plate and over the stationary conveyor chains 27 into contact with the operating lever 44 to depress the same and thereby restart the machine. Under such circumstances, the resultant break in the container supply would be of a width substantially equal to the linear extent of the overrun of conveyor chains 27 occurring after opening of the switch 42. Such a break is of relatively little importance as it probably would result only in failure to position a container in one of the notches 29 of the star wheel 13. However, if the supply of containers has been so furnished by the conveyor 31 that the container following the last container 38 is spaced therefrom a distance less than the linear extent of the overrun of conveyor chains 27, it will be apparent that this succeeding container could engage the operating lever 44 during the overrun period and result in restarting of the capping machine before it has actually come to rest. If this succeeding container is followed by a substantial number of abutting containers, the ultimate result will not be particularly harmful. However, if the supply has been furnished by the conveyor 31 in such a manner that the succeeding container is alone or is one of several widely spaced separate containers, the successive making and breaking of the electrical current supply to motor 14 would result in extremely jerky and unsatisfactory operating of the capping device and might result in operation of the capping device with a great number of the container engaging notches unfilled. According to the present invention I provide means for preventing restarting of the conveyor by a single container or by a badly broken line of containers.

Referring now to Figs. 2 to 6 inclusive, I have shown one form of means for cooperating with the switch operating lever 44 to attain the objects of my invention. In general, the mechanism shown in these figures comprises a latching means adapted to engage the lever 44 when the same is in the position illustrated in Fig. 2 corresponding to an open position of the electrical contacts within switch 42. The latching means is adapted to connect a loading device to the lever 44 which will offer substantial resistance to movement of the lever from the position illustrated in Fig. 2. I provide means for adjusting the amount of resistance offered by this device in accordance with any particular demand placed upon the same.

As shown in Fig. 2, a bracket 50 is secured to the conveyor supporting structure 28 in any suitable manner as, for example, by the use of bolts 51. The bracket 50 carries a pivot stud 52 upon which is pivoted a member 53. The member 53 carries a weight arm or extension 54 upon which is adjustably mounted a weight 55 which may be provided with means such as a set screw 56 for securing the weight in adjusted position along the arm 54. The weight 55 serves to urge the member 53 to rotate in a clockwise direction, as viewed in Fig. 2, about its pivot 52. The extent of such clockwise rotation may be adjustably varied by means such as a set screw 57 carried by a downwardly projecting portion of the member 53 and adapted to contact a suitable abutment 58 carried by an extension of the bracket 50. A lock nut 59 may be provided to secure the set screw 57 in desired adjusted position.

The upper portion of the member 53 carries a pivot stud 60 upon which is freely pivoted a latch 61. The latch 61 is formed at one end with a weight 62 which serves to urge the latch to rotate in a clockwise direction as viewed in Fig. 2. The extent of such clockwise rotation may be limited by suitable means such as an abutment 63 formed upon the member 53. At its opposite end the latch 61 is provided with a latch seat 64 and an inclined nose portion 65 leading to the latch seat 64.

The control lever 44 may have formed thereon or secured thereto in any suitable manner a latch stud 66 formed with a reduced tip 67 flared outwardly toward its end to provide an angular engaging portion for cooperation with the latch seat 64. Preferably the angular relation between the flared tip 67 and the abutment portion of latch seat 64 is such that these portions diverge when in latching engagement as shown in Fig. 2. This provides against any tendency for the parts to bind or stick in latched position and further provides for smooth disengagement thereof when these parts are relatively moved as hereinafter described.

In the position illustrated in Fig. 2 the weight arm 54 is rotated to the extent permitted by the set screw 57 while the latch 61 is rotated to the extent permitted by the abutment 63. With the parts in these positions and when the control lever 44 is in the position illustrated in Fig. 2 the latch stud 66 will be engaged by the latch seat 64 as shown in said figure. When it is attempted to rock the control lever 44 in a clockwise direction about its pivot 43 such attempt will be resisted by the weight 55 since the movement of the lever 44 is transmitted through the latch 61 to the member 53.

Referring now to Fig. 4, the lever 44 has been rocked in a clockwise direction and the latch 61 has been carried to the left to rotate member 53 in a counterclockwise direction and to raise the weight arm 54 and weight 55. In this operation the latch 61 rotates with the member 53 and accordingly the latch seat 64 has been rotated generally about the pivot 52. The tip 67 of the latch stud 66 has been rotated in a clockwise direction about the pivot 43 of lever 44. Accordingly, the tip 67 and latch seat 64 have moved along divergent paths. As shown in Fig. 4, these two elements are just in the act of separating. From the position thus shown in Fig. 4 further depression of the control lever 44 will result in disengagement between the tip 67 and latch seat 64. Upon such disengagement of the latching elements the weighted arm 54 will immediately cause rotation of member 53 about the pivot 52 to the position limited by the set screw 57. Since the latch 61 is freely pivoted upon the stud 60 the rotation of member 53 will have no effect upon the control lever 44, except that the nose 65 of the latch 61 will be yieldably urged against the tip 67 of the stud 66 as a result of the influence of the weighted end 62. In Fig. 5, the control lever 44 is shown fully depressed and the latching mechanism is shown in the position assumed upon disengagement of the elements 67 and 64. It will be understood that in the position illustrated in Fig. 5 the control lever 44 is urged to rotate in a counterclockwise direction only by the weighted end 47 thereof. It is an outstanding feature of my invention that the weighted end 47 may be so designed that the actual force available to urge rotation of the lever 44 may be so light as to present no tendency toward lifting the containers positioned thereover and to offer no resistance to the passage of containers.

When a break in the line of containers occurs and the last container within a group passes beyond the extremity of the surface 49 of the control lever 44, the control lever will swing in a counterclockwise direction to effect opening of the switch contacts within switch 42. In Fig. 6, the control lever 44 is shown in a partially rotated position assumed as a result of a break in the line of containers. As shown in said figure the tip 67 of latch stud 66 engages the inclined nose surface 65 of the latch 61 and rotates the latch in a counterclockwise direction about its pivot 60. In this operation, the weighted end 62 is raised out of contact with the abutment 63. Further and final counterclockwise rotation of the lever 44 will move the tip 67 into position for engagement by the latch seat 64 whereupon the weight 62 will rock the latch 61 and engage the latch seat 64 with the tip 67 in the position illustrated in Fig. 2.

From a consideration of the above description, it will be apparent that I have provided a mechanism which attains the objects of my invention. The latching mechanism is so designed that clockwise switch closing movement of the control lever 44 is resisted by the weighted arm 54 while counterclockwise switch opening rotation of the control lever 44 is effected entirely without the assistance of or interference by the weighted arm 54. The freely pivoted latch 61 and the particular design of the latching elements 64 and 67 provide for reliable and practically frictionless engagement and disengagement between the control lever 44 and weighted arm 54.

In Figs. 7 to 10 inclusive, I have disclosed a modified form of means for attaining the objects of my invention. In general, this modified form of my invention utilizes a latching mechanism so connected with a loading spring that switch closing movement of a control lever interposed in the path of containers on the conveyor is resisted by such loading spring but once the control lever has been moved to switch closing position the spring will be ineffective to tend to return the control lever to its switch opening position.

Referring now to Fig. 10, I have shown a switch casing 68 which may contain an electrical switch of any desired type and which is adapted to be opened and closed by partial rotation of a switch control shaft 69. The actual switch contacts are not shown since they may be of any desirable form.

The switch operating shaft 69 is shown projecting downwardly from the switch case 68 and carries a generally cylindrical collar or hub 70 fixed for rotation therewith as by a set screw 71. A switch operating lever 72 is anchored within the hub 70 and projects across the path of containers carried by the conveyor chains 127 (see Fig. 7). The control arm 72 may be conveniently positioned beneath the conveyor guide rails 135 and 136 as shown in Fig. 10. The control lever 72 comprises a generally straight portion extending radially to the switch operating shaft 69 and this radial portion extends sufficiently into the path of the containers carried by the conveyor so as to serve as an abutment against which the containers are adapted to be impinged. The operating lever further comprises a bent or offset portion 73 which bears such an angular relationship to the radial portion of the lever 72 that it is adapted to be swung into a position substantially parallel with the path of the containers when the control lever is rotated into the position which it is approaching in Fig. 8 and which it has assumed in Fig. 9. The switch-operating lever 72 is urged to rotate in a counterclockwise direction into the position illustrated in Fig. 7 by a relatively light spring 74 stretched between the lever 72 and a suitable anchorage 75 carried by a support plate 77. The extent of rotation thus imparted to the lever 72 is limited by suitable abutment stud 76 carried by the plate 77. The support plate 77 is secured to the switch casing 68 through a pair of spacing members or legs 78 and 79 as shown in Figs. 7 and 10.

The hub 70 has a notch 80 formed therein which terminates in a radially disposed abutment edge 81. The notch 80 and abutment 81 constitute a latch seat. In Figs. 7 and 8 a portion of the plate 77 has been broken away in order to reveal the hub 70 and the latch seat therein.

A lever 82 is pivoted as at 83 to the plate 77 and carries near its free end a pilot pin 84 upon which is pivotally carried a latch lever 85. The latch lever 85 is notched as at 86 adjacent its free end to provide an abutment 87 adapted to be received in latching engagement by the latch seat formed in hub 70. A relatively heavy loading spring 88 is stretched between a suitable anchorage 89 on the plate 77 and a suitable anchorage 90 upon the latch lever 85. The anchorage 90 is preferably offset from the line between pivot 84 and anchorage 89 whereby the contractile force of the spring 88 tends not only to draw the latch lever 85 to the right as viewed in Fig. 7 but also to swing the latch lever 85 in a counterclockwise direction about its pivot 84. The lever 82 has an extension 91 in which is received at a set screw 92 adapted for abutment against an abutment surface 93 formed upon the leg 78. Abutment between the set screw 92 and surface 93 serves to limit rotation of the lever 82 and rightward movement of the latch lever 85 under influence of the spring 88. The exact extent of such movement may be varied by adjustment of the set screw 92 which may be locked in desired adjusted position by a lock nut 94.

As shown in Fig. 7, the control lever 72 has been rotated in a counterclockwise direction by the spring 74 into a position in which the electrical contacts within switch casing 68 are in opened position. It will be understood that in this position of the parts the driving motor of the capping machine is deenergized. In this position the latch elements 81 and 87 are in latching engagement under the influence of spring 88 and it is apparent that an attempt to rotate the control lever 72 in a clockwise direction will be resisted by the contractile force of spring 88. The loading spring 88 may be so selected as to afford any degree of resistance which may be desired for a particular installation.

Proceeding now to Fig. 8, it will be seen that the control lever 72 has been rotated in a clockwise direction against the force of springs 88 and 74. As shown in this figure, the abutment 81 of the latch seat in hub 70 has been moved in a path corresponding to the circumference of the hub 70. The portion 86 of the latch lever 85 has been urged into contact with the circumferential surface of the hub 70 and will serve to prevent any further counterclockwise rotation of the latch lever 85 under the force of spring 88. Accordingly, continued clockwise rotation of the control lever 72 will result in disengagement of the abutment 81 from the abutment 87. Immediately that this disengagement occurs the spring 88 will be disconnected from the control lever 72 and will draw the latch lever 85 to the right to an extent permitted by the adjustment of the set screw 92 upon the lever 82. The position thus assumed by these parts is illustrated in Fig. 9.

It will be apparent, therefore, that in the position illustrated in Fig. 9 the control lever 72 is urged in a counterclockwise direction by the spring 74 alone and the portion 73 of the control lever will therefore exert only a light pressure against the containers positioned upon the conveyor 127. When a break occurs in the line of containers carried by the conveyor chains 127 the control lever 72 will be rotated in a counterclockwise direction by the spring 74. As the control lever 72 nears the maximum extent of such counterclockwise movement the abutment 81 of the latch seat in hub 70 will be positioned to permit the latch abutment 87 to be urged into the latching position illustrated in Fig. 7 whereupon the spring 88 will be connected to the control lever 72 as heretofore described.

The operation of my invention under various circumstances will now be described in connection with diagrammatic Figures 11 to 19 inclusive. In these figures, I have illustrated the operation of the form of my invention shown in Figs. 1 to 6 inclusive.

Figs. 11, 12 and 13 illustrate the operation of my control device when a break occurs in the line of containers carried by the conveyor chains 27. In these figures, the break comprises the space between the last container 138 and the first container within the supply 139 furnished to the conveyor chains by the main conveyor illustrated in Fig. 1 and identified by reference numeral 31. The space between container 138 and the leading container 139 will be assumed to be greater than the linear extent of overrun or coasting movement performed by the chains 27 upon deenergizing of the main driving motor illustrated in Fig. 1 and identified by reference numeral 14. In Fig. 11 the last container 138 is positioned in contact with the control lever 44 and it will be understood that each of the containers preceding the container 138 has successively been in contact with the control lever 44 and has served to maintain this lever in the position illustrated in Fig. 11 wherein the motor 14 remains energized and the conveyor and capping apparatus continues to operate. As the container 138 continues its movement to the right under these circumstances it will be moved beyond the extreme end of the lever 44 whereupon the lever will rotate in a counterclockwise direction as heretofore described and will serve to operate the switch 42 to deenergize the driving motor. The conveyor 27 will thereupon proceed to coast a certain distance and this distance has been arbitrarily illustrated in Fig. 12 wherein it is assumed that the conveyor 27 has finally come to rest and the container 138 has been moved to the right a substantial distance beyond the control lever 44. The leading container 130 has, of course, been carried a corresponding distance by the conveyor and has thereby approached the lever 44. Since the conveyor chain is now stationary, the leading container 130 can only be moved by the action of the main conveyor 31 in supplying a continuous line of containers across the dead plate 34 and across the stationary chains 27. When such a continuous line has been built up the container 130 will be moved to the right as illustrated in Fig. 13 and finally into contact with the control lever 44. Continued effort on the part of the main conveyor 31 will force the container 130 to depress the lever 44 against the resistance of weighted arm 54 resulting in closing the switch contacts within switch 42 and reenergization of the driving motor 14. During the rotation of control lever 44 the latching elements 67 and 64 will become disengaged as heretofore discussed and the lever 44 thereafter will be maintained in switch-closing position by the solid line of containers following container 130. The described operation of my control device therefore assures that the conveyor 27 and capping device will not be restarted until a continuous supply of containers extends between the main conveyor 31 and the control switch 44. It is thus assured that the capping device will thereafter run for at least a reasonable length of time.

In Figs. 14, 15 and 16, I have illustrated the operation of my control device when the break in the line of containers on the conveyor 27 is of a width less than the linear extent of the coasting or overrunning movement of the conveyor 27 occurring after deenergization of the driving motor. In these figures the break is illustrated by a space between the last container 238 and the leading container 230 of a group of four closely spaced or abutting containers comprising containers 230, 231, 232 and 233. As shown in Fig. 14, the container 238 is positioned above the control lever 44 and consequently the machine is assumed to be running. As the container 238 continues movement to the right it will pass beyond the extremity of lever 44 and the lever will thereupon swing to switch-opening position illustrated in Fig. 15. As the conveyor 27 continues in its coasting movement, the leading container 230 is brought up into contact with the control lever 44. Since the containers 230, 231, 232 and 233 are in abutting relationship the friction between each of these containers and the conveyor chains 27 will combine whereby the container 230 will exert approximately four times as much force upon the lever 44 as it would were it presented alone. The resistance offered by the weight arm 54 to clockwise motion of the lever 44 is preferably so adjusted that the combined force of four or some other predetermined number of containers may overcome it and swing the control lever 44 to switch-closing position, as illustrated in Fig. 16. Under these circumstances the driving motor 14 is temporarily deenergized but is reenergized before it has been allowed to come to rest. It will thus be seen that by proper adjustment of the weight 55 along the weight arm 54 the degree of resistance offered by the control lever 44 may be so varied that a predetermined number of abutting or very closely spaced containers may serve to restart the machine during the coasting or overrun period. It will be seen that this adjustment may be availed of to insure that the machine will not be restarted unless it is assured that sufficient containers are available to permit operation of the machine for a reasonable period of time.

In Figs. 17, 18 and 19, I have illustrated the operation of my control device when the break in the line of containers on the conveyor 27 is of a width less than the linear extent of the coasting or overrunning movement of the conveyor 27 occurring after deenergization of the driving motor. In these figures, the break is illustrated by a space between the last container 338 and a single succeeding container 339. A container 340 is shown succeeding the container 339 at a substantial distance therefrom. Another succeeding container 341 is shown spaced from the container 340. It may be seen that deenergization of the motor after the container 338 passes beyond the extremity of the control lever 44 will be followed by a period of coasting or overrun during which the container 339 will be brought into contact with the lever 44. Without the provision of my invention the control lever 44 would be depressed by the container 339 and the machine would be restarted to run only for such time as was consumed by the passage of the container 339 over the control lever. The machine would then be again deenergized and again restarted by the container 340 and this undesirable operation might continue for a long period of time. When my invention is applied this undesirable operation is entirely avoided. Thus, upon the deenergization of the machine resulting from the passage of container 338 beyond the control lever 44 the control lever is engaged by the latching means above described. Upon contact of the container 339 with the control lever the resistance offered by the weight arm 54 is such as to prevent restarting of the machine. The force which the container 339 is capable of exerting upon the control lever 44 is dependent upon the weight of the container and the resulting frictional action between the container and the conveyor chains 27. According to my invention, the weight arm 54 is so adjusted that the force exertible by a single container will be insufficient to depress the control lever 44. Accordingly, the container 339 abuts the control lever 44 and is held stationary thereby. Continued coasting or overrunning of the conveyor chains 27 merely results in slippage thereof beneath the container 339. As explained above, the machine cannot now be restarted until the containers 340, 341, et seq. are pushed up into contact with the container 339 by the action of the main conveyor 31. In Fig. 18 I have illustrated the final position assumed by the container 339 when the machine comes to rest and in Fig. 19 I have shown a succeeding line of containers headed by the container 341 which is approaching the container 340 and which will eventually push the container 340 into contact with container 339 to ultimately depress the control lever 44 and restart the machine.

In connection with the showing in Figs. 17, 18 and 19 it will be understood that the weight arm 54 may be so adjusted that the machine will not restart when two or three or any other undesirable low number of containers follows a break of an extent less than the linear extent of overrun. While I have illustrated my invention in Figs. 14, 15 and 16 as enabling the machine to be restarted by four or more containers and preventing the restarting thereof by less than four, it is to be understood that such number has been chosen merely for the purposes of illustration and that any reasonable number may be selected in accordance with the size of the objects upon the conveyor or the characteristics of the machine to which the conveyor is conducting such objects.

The operation of the modified form of my invention illustrated in Figs. 7 to 10 inclusive is identical with that described in connection with Figs. 11 to 19 inclusive. It will be understood that the control lever 72 in the modified form will operate in the same manner as the control lever 44 in the preferred form. In Fig. 7 a single container 439 is illustrated in contact with the control lever 72 when the control lever is in its switch-opening position. It will be understood that the control lever is at this time latched to the loading spring 88 and that the resistance thus offered will be so great as to prevent swinging of the control lever by the force exertible by a single container. The resistance offered by spring 88 may be so chosen as to prevent restarting of the machine by any undesirably small number of containers thus presented. In Fig. 8 a plurality of containers 439, 440 and 441 et seq. are shown in the act of swinging the control lever 72 to switch-closing position. This illustration may be assumed to be as a result of building up a solid line of containers by the action of main conveyor 31 or it may be assumed to be the result of a grouping of containers such as illustrated in diagrammatic Figures 14, 15 and 16.

While for the purposes of illustration I have described my invention with particular reference to its value in a container-capping machine, it is to be understood that the application of the invention is not thus limited. The invention may be advantageously employed in machines of many types and will be of particular value in relationships wherein an occasional break in the line of objects conducted by a conveyor is of no great consequence but wherein a great number of breaks occurring at frequent intervals would be highly objectionable. My invention may be so applied as to prevent final stoppage of the conveyor upon the occurrence of breaks of little consequence and to insure final stoppage of the machine upon the occurrence of other types of breaks which may be of a serious nature.

The foregoing detailed description of particular forms of my invention has been made for the purpose of complying with the patent statutes but such detailed description is intended to be taken in an illustrative rather than in a limiting sense. It is obvious that modifications and variations in detail can be made by those skilled in the art and that any such modifications and variations shall be within the scope of the appended claims.

I claim:

1. A conveyor; means for driving said conveyor; a device for stopping said conveyor, said device being biased into the path of objects on said conveyor with a force insufficient to interfere with the movement of a single object, said device moving into the path of said objects and stopping the conveyor upon the occurrence of a substantial gap between said objects; means becoming operative only when said device has moved into the path of said objects for resisting the restoration of said device to its position out of the path of said objects, said resisting means being adapted to be overcome only by the approach of a predetermined minimum number of objects; and means responsive to restoration of said device to its position out of the path of said objects to render said resisting means inoperative.

2. A conveyor; means for driving said conveyor; a control device; means for biasing said control device into contact with objects on said conveyor with a force insufficient to interfere with the movement of a single object on said conveyor; said control device being maintained in a position out of the path of said objects by contact of said objects therewith; said biasing means moving said device into the path of said objects to stop said conveyor upon the occurrence of a substantial gap between successive objects on said conveyor; means becoming operative only when said device has moved into the path of said objects for resisting restoration of said device to its position out of the path of said objects, said last-named means being adapted to be overcome only by the approach of a predetermined minimum number of objects; and means responsive to restoration of said device to its position out of the path of said objects to render said resisting means inoperative.

3. A conveyor; means for driving said conveyor; a control device; means for biasing said control device into contact with objects on said conveyor with a force insufficient to interfere with the movement of a single object on said conveyor; said control device being maintained in a postiion out of the path of said objects by contact of said objects therewith; said biasing means moving said control device into the path of said objects to stop said conveyor upon the occurrence of a substantial gap between successive objects on said conveyor; loading means; and means becoming operative only when said control device has moved into the path of said objects to connect said loading means with said control device, said loading means thereupon resisting restoration of said control device to its position out of the path of said objects with a force adapted to be overcome only by the approach of a predetermined minimum number of objects.

4. A conveyor adapted to carry a line of objects along a predetermined path; driving means for said conveyor; a control device; means for biasing said control device into contact with successive objects within said line with a force insufficient to interfere with the movement of a single object along said path, said biasing means operating to move said control device into a position in the path of said objects to stop said conveyor upon the occurrence of a gap between successive objects in said line; and means becoming operative only when said control device has moved into the path of said objects for resisting the restoration of said device to its position out of the path of said objects, said means being adapted to be overcome only by the approach of a predetermined number of objects.

5. A conveyor; means for driving said conveyor; a device for stopping said conveyor, said device being biased into the path of objects on said conveyor with a force insufficient to interfere with the movement of a single object on said conveyor, said device moving into the path of said objects and stopping the conveyor upon the occurrence of a substantial gap between successive objects on said conveyor, loading means; and latching means adapted to connect said loading means with said device only when said device has moved into the path of said objects, said loading means being so constructed and arranged as to resist restoration of said device to its position out of the path of said objects with a force sufficient to prevent restoration of said device by the approach of less than a predetermined minimum number of objects.

6. A conveyor; means for driving said conveyor; a device for stopping said conveyor, said device being biased into the path of objects on said conveyor with a force insufficient to interfere with the movement of a single object on said conveyor, said device moving into the path of said objects and stopping the conveyor upon the occurrence of a substantial gap between successive objects on said conveyor; loading means; a latching element associated with said device; a latching element associated with said loading means; said latching elements being adapted to engage one another when said device has moved into the path of said objects to connect said loading means to said device; said loading means being so constructed and arranged as to resist restoration of said device to its position out of the path of said objects with a force sufficient to prevent restoration of said device by the approach of less than a predetermined minimum number of objects.

7. A conveyor adapted to carry a line of objects along a predetermined path; driving means for said conveyor; a control device held in a position to maintain said conveyor in operation by successive individual objects within said line and adapted to take a second position to stop said conveyor upon the occurrence of a gap between successive objects in said line, means operative when said control device is in said second position to resist restoration of said device to its original position except upon the imposition of a force greater than that exertible by individual containers within said line, and means responsive to restoration of said device to its position out of the path of said objects to render said resisting means inoperative.

8. A conveyor; means for driving said conveyor; a control device; means for biasing said control device into contact with objects on said conveyor with a force insufficient to interfere with the movement of a single object on said conveyor; said control device being maintained in a position out of the path of said objects by contact of said objects therewith; said biasing means moving said control device into the path of said objects to stop said conveyor upon the occurrence of a substantial gap between successive objects on said conveyor; a pivoted arm; a weight on said arm to resist rotation of said arm; and means becoming operative only when said control device has moved into the path of said objects to connect said pivoted arm with said control device, said weight thereupon resisting restoration of said control device to its position out of the path of said objects with a force adapted to be overcome only by the approach of a predetermined minimum number of objects.

9. A conveyor; means for driving said conveyor; a control device; means for biasing said control device into contact with objects on said conveyor with a force insufficient to interfere with the movement of a single object on said conveyor; said control device being maintained in a position out of the path of said objects by contact of said objects therewith; said biasing means moving said control device into the path of said objects to stop said conveyor upon the occurrence of a substantial gap between successive objects on said conveyor; a loading spring; and means becoming operative only when said control device has moved into the path of said objects to connect said loading spring with said control device, said loading spring thereupon resisting restoration of said control device to its position out of the path of said objects with a force adapted to be overcome only by the approach of a predetermined minimum number of objects.

10. In combination, a machine adapted to receive and operate upon objects successively presented thereto; means to supply a line of objects to said machine; driving means for said machine; a control device held in a position to maintain said machine in operation by successive individual objects within the line of objects supplied by said supply means; said control device being adapted to take a second position to stop said machine upon the occurrence of a gap between successive objects in the line supplied by said supply means; and means operative when said control device is in said second position to resist restoration of said device to its original position except upon the imposition of a force greater than that exertible by individual objects within said line.

HOWARD E. GANTZER.